No. 714,900. Patented Dec. 2, 1902.
G. HILLER.
MECHANISM FOR UNITING THE ENDS OF WARP THREADS.
(Application filed Dec. 5, 1900.)
(No Model.) 7 Sheets—Sheet 2.

Witnesses:-
M. F. Roy.
J. A. Richardson.

Inventor.
Gustav Hiller.
by J. Littman.
Atty.

No. 714,900. Patented Dec. 2, 1902.
G. HILLER.
MECHANISM FOR UNITING THE ENDS OF WARP THREADS.
(Application filed Dec. 5, 1900.)
(No Model.) 7 Sheets—Sheet 4.

Witnesses:—
M. F. Roy.
J. A. Richardson.

Inventor.
Gustav Hiller.
by G. Sittman
Atty.

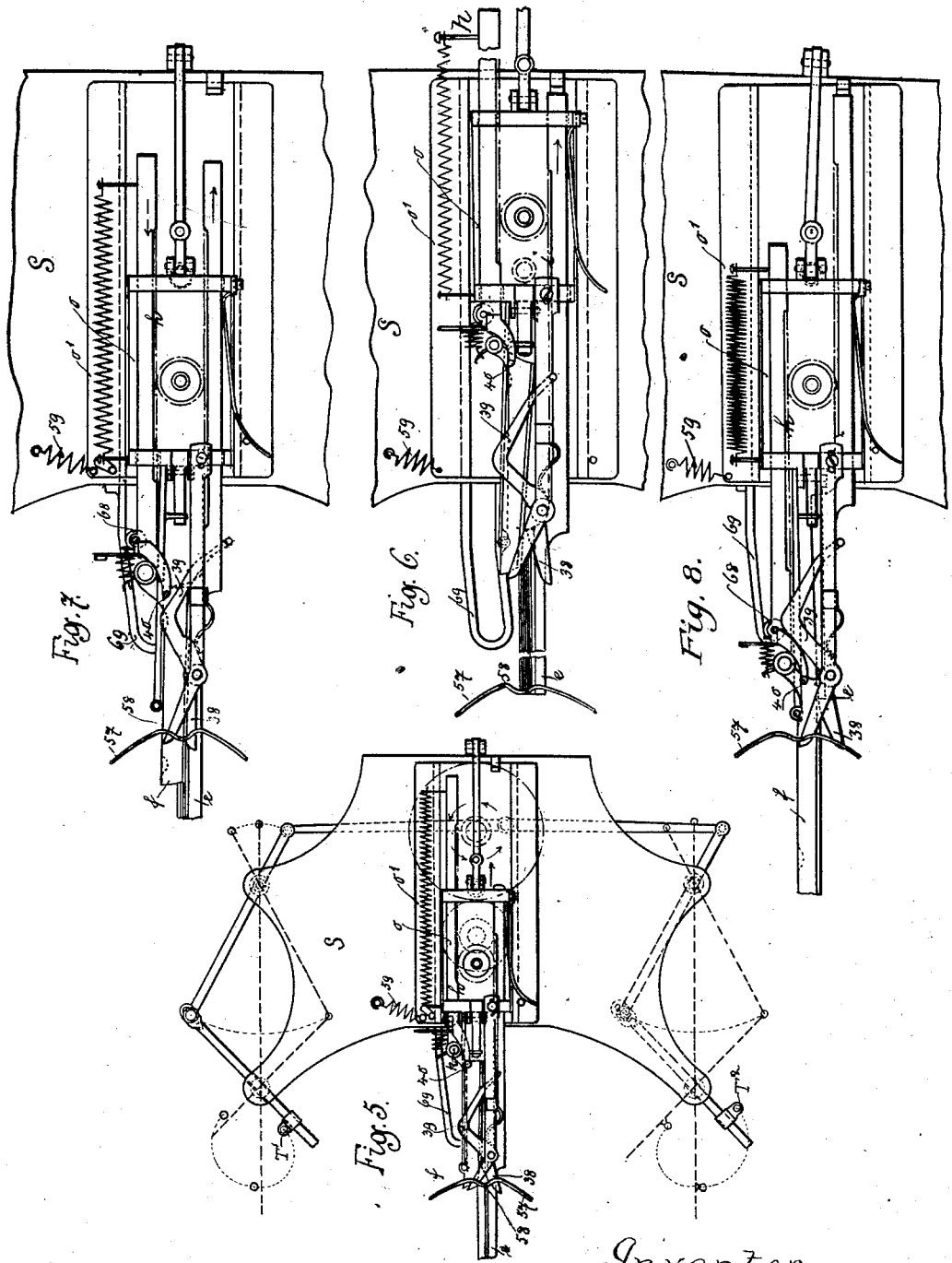

No. 714,900. Patented Dec. 2, 1902.
G. HILLER.
MECHANISM FOR UNITING THE ENDS OF WARP THREADS.
(Application filed Dec. 5, 1900.)
(No Model.) 7 Sheets—Sheet 6.

Witnesses:
M. F. Roy.
J. A. Richardson.

Inventor:
Gustav Hiller
by G. Dittman
Atty

No. 714,900. Patented Dec. 2, 1902.
G. HILLER.
MECHANISM FOR UNITING THE ENDS OF WARP THREADS.
(Application filed Dec. 5, 1900.)
(No Model.) 7 Sheets—Sheet 7.

Schnitt a-b.

Schnitt e-f.

Witnesses:
M. F. Roy.
J. A. Richardson.

Inventor
Gustav Hiller,
by G. Dittmar
Atty.

UNITED STATES PATENT OFFICE.

GUSTAV HILLER, OF ZITTAU, GERMANY.

MECHANISM FOR UNITING THE ENDS OF WARP-THREADS.

SPECIFICATION forming part of Letters Patent No. 714,900, dated December 2, 1902.

Application filed December 5, 1900. Serial No. 38,830. (No model.)

*To all whom it may concern:*

Be it known that I, GUSTAV HILLER, a subject of the King of Saxony, residing at Zittau, in the Kingdom of Saxony, in the German Empire, have invented certain new and useful Improvements in Mechanism for Uniting the Ends of Warp-Threads; and I do hereby declare the following to be a full, clear, and exact description of the invention, reference being had to the accompanying drawings, and to the characters of reference marked thereon, which form part of this specification.

It is already known in the art that warp-threads can be united mechanically by the frictional rubbing against each other of two cheek-pieces. The subject of the present invention are new and peculiar devices on such machines for uniting warp-threads. They comprise a so-called "preliminary separator" for assisting the thread-separator in its work, as also devices for the purpose of obtaining an exactly parallel position of the threads to be twisted in the clamp, from which they are lifted by the gripper-hooks.

The accompanying drawings illustrate the new invention.

Figure 1:
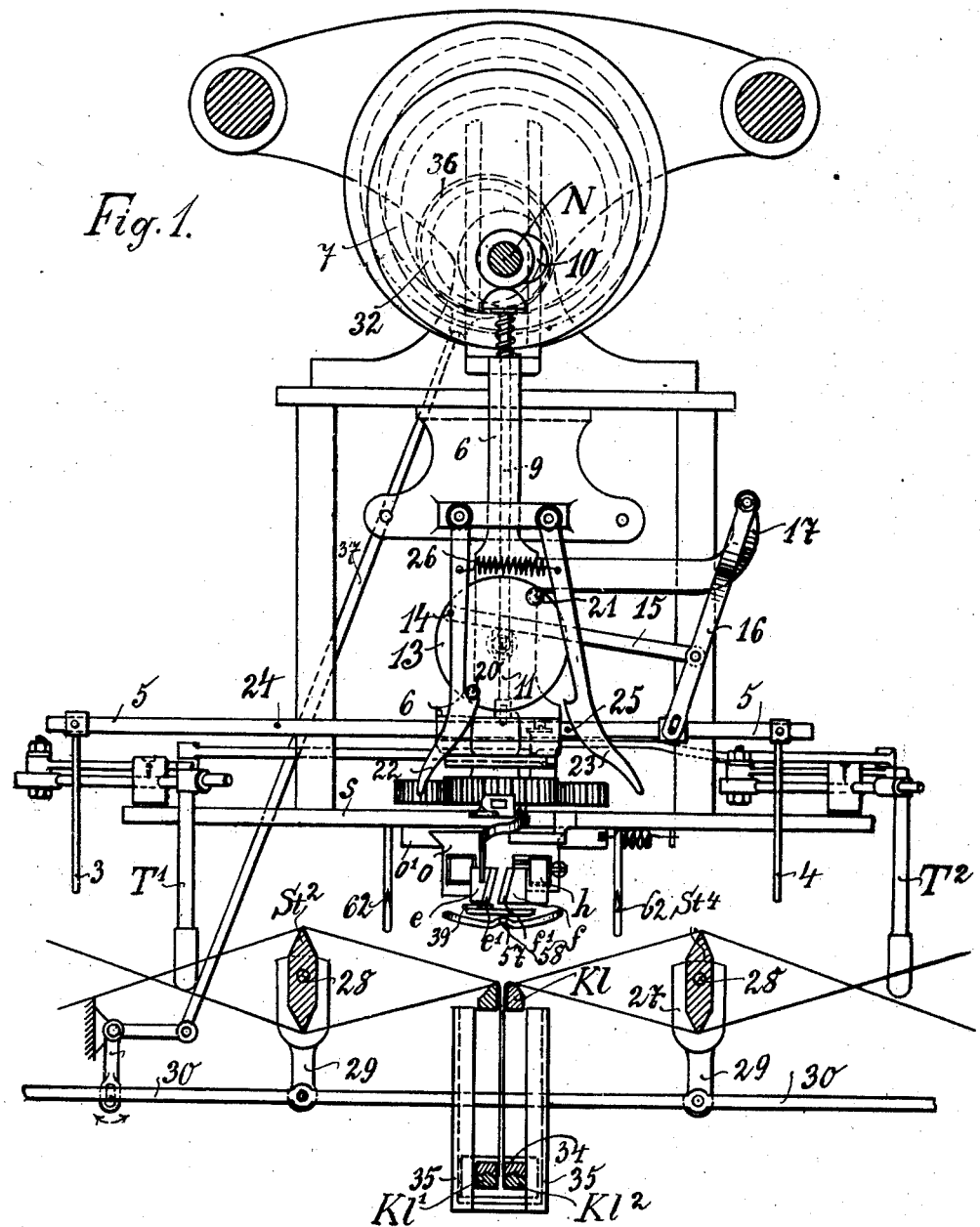
Figure 2:
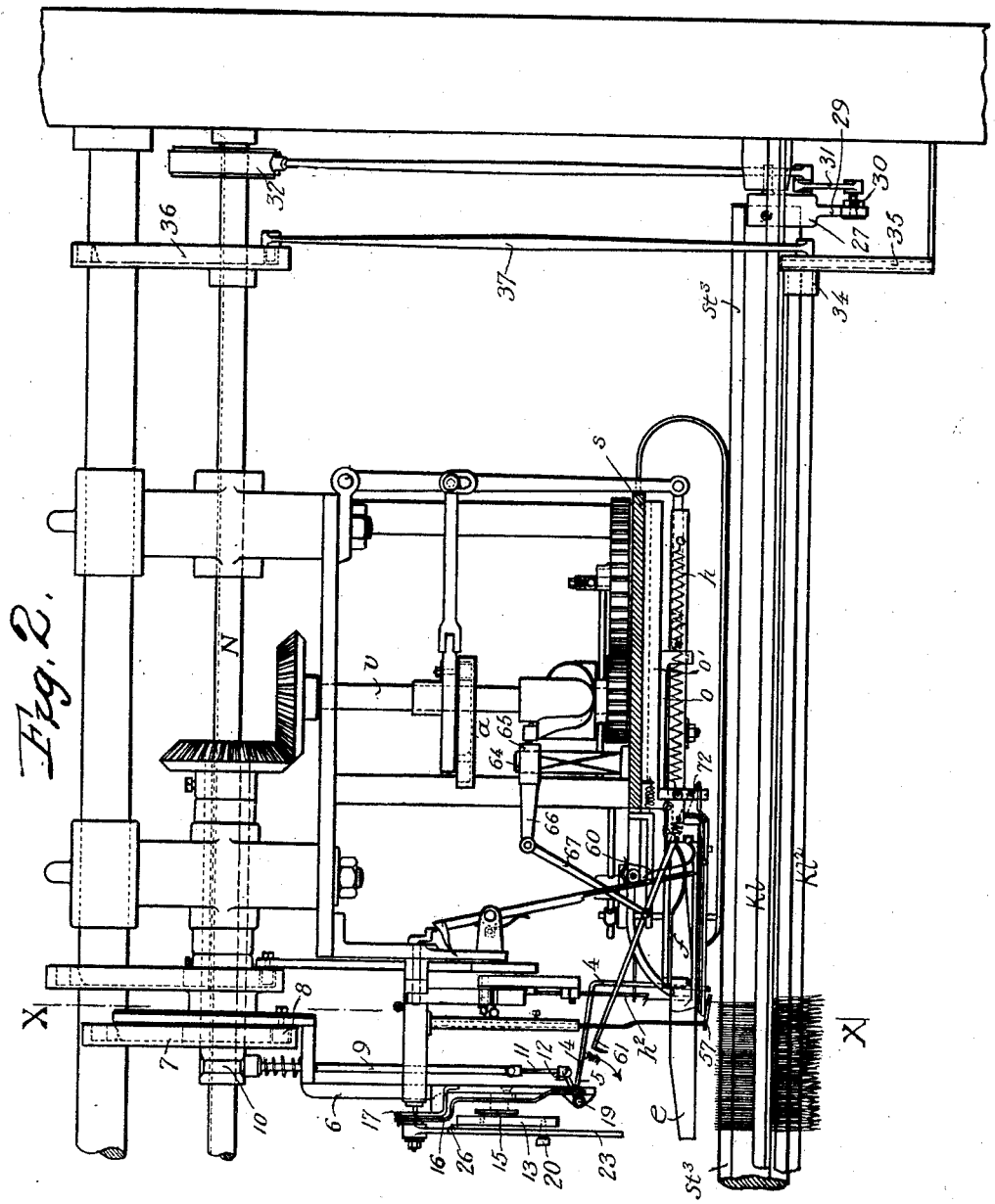
Figure 3:
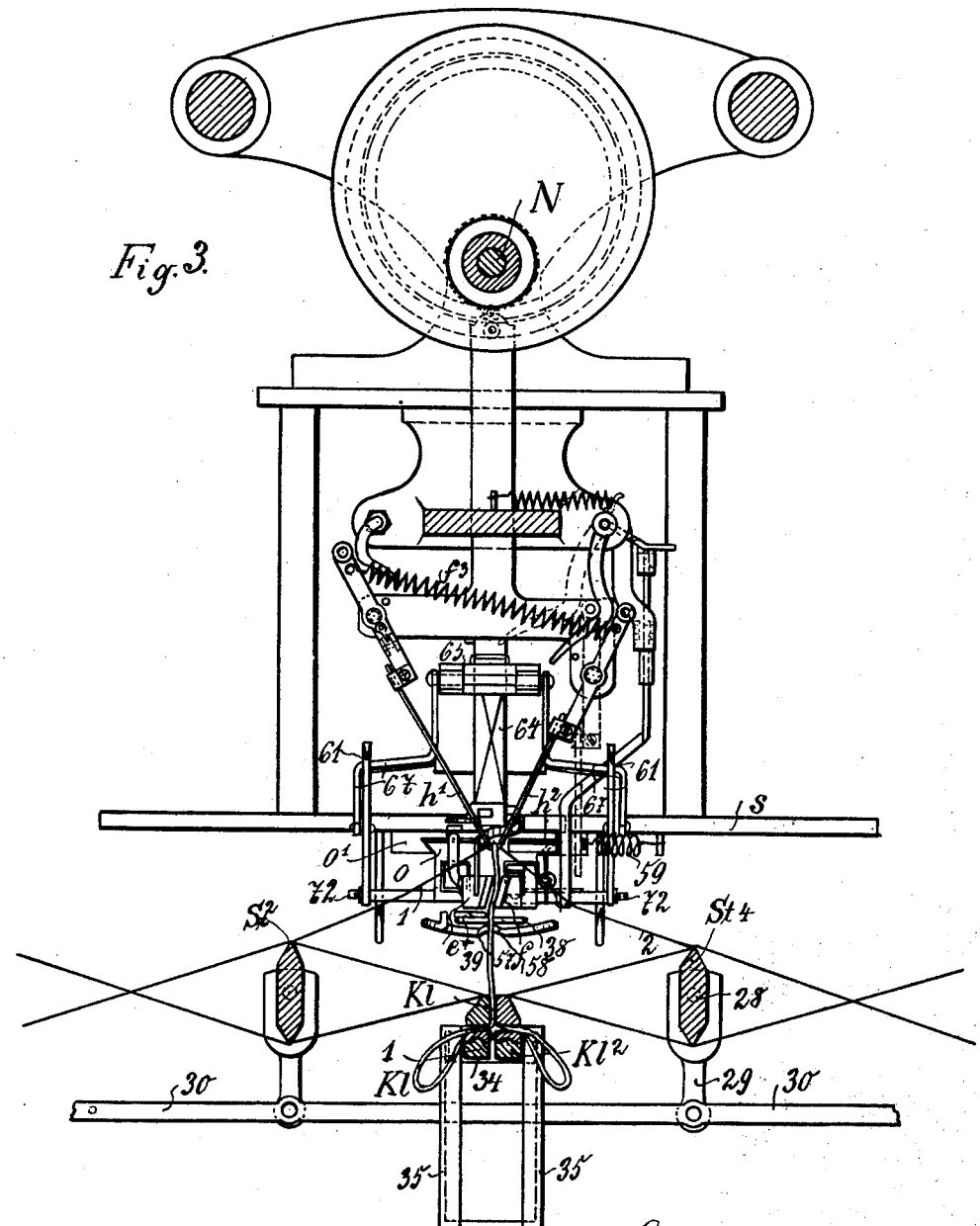
Figure 4:
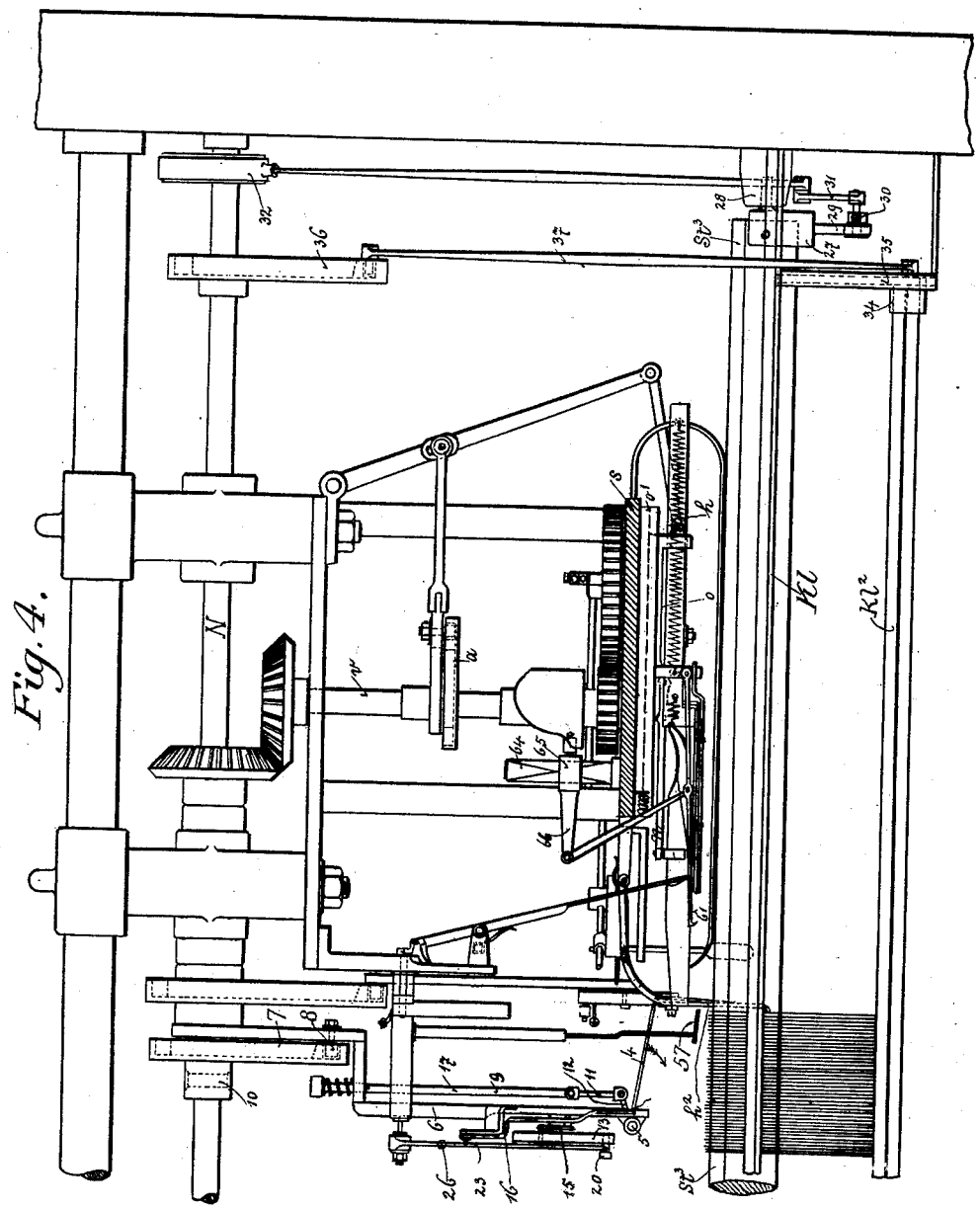

Figure 1 is a front view of the machine; Fig. 2, a side view, partly in section; Fig. 3, a section on the line X X of Fig. 2. Fig. 4 shows a view similar to Fig. 2, the parts being in a different position. Figs. 5 to 8 are views from below. Figs. 9 to 13 show detail views. Figs. 14 to 17 show an arrangement whereby the cheek-pieces are replaced by pincer mechanism rotating about its axis.

The ends of both warps to be twisted together before being removed from the loom or beaming-machine are clamped between the cheek-pieces $Kl'$ and $Kl^2$. These cheek-pieces or jaws are both set in the shoe 34, which is arranged below the stationary clamp $K'$ and can be moved vertically up and down in guideways 35. The shoes 34 receive their motion by means of eccentrics 36 and rods 37 from the shaft N in such a manner that they follow the upward motion of the gripper-hooks $h'\ h^2$. The latter do not, therefore, have to draw the threads from the clamps $Kl'\ Kl^2$, as hitherto has been the case, necessitating an extremely slow speed where certainty of operation is desired. As the thread ends thus remain in the clamps $Kl'\ Kl^2$, and, furthermore, for the purpose of maintaining thorough uniformity of length of the ends to be twisted and obtaining a pieced thread, the threads to be joined as soon as they are seized by the jaws $e$ and $f$ and the opposing motion of the latter commenced are cut off by a pair of shears below the jaws. The one jaw 38 of the shears is rigidly connected to the under side of the slide $o$, while the other jaw 39, held open by a spring, is bent at an angle and when the motion of the jaws $e\ f$ in opposing directions is commenced is engaged by a projection 40 on the rack $h$, lying in the path of the bend, whereby the shear-jaws close and cut the threads, as shown in Figs. 5 to 8.

The work of the gripper-hooks $h'$ and $h^2$, which consists particularly in bringing together the two threads which are about to be united, is assisted in the construction here illustrated by a wire 57, which draws together the two threads 1 and 2 to be lifted. The wire is located below and in front of the jaws and is shown in detail, together with the gripper-hooks, in Fig. 13. The bowed wire 57 has at its center a bridge 58, into which the threads 1 and 2 on ascent and closing of the gripper-hooks are introduced and finally drawn close together.

Figure 12:
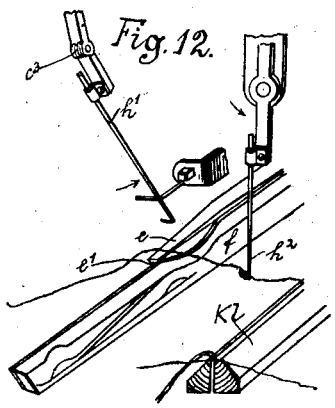
Figure 13:
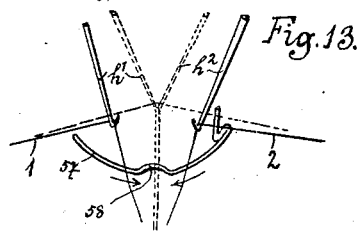
Figure 14:
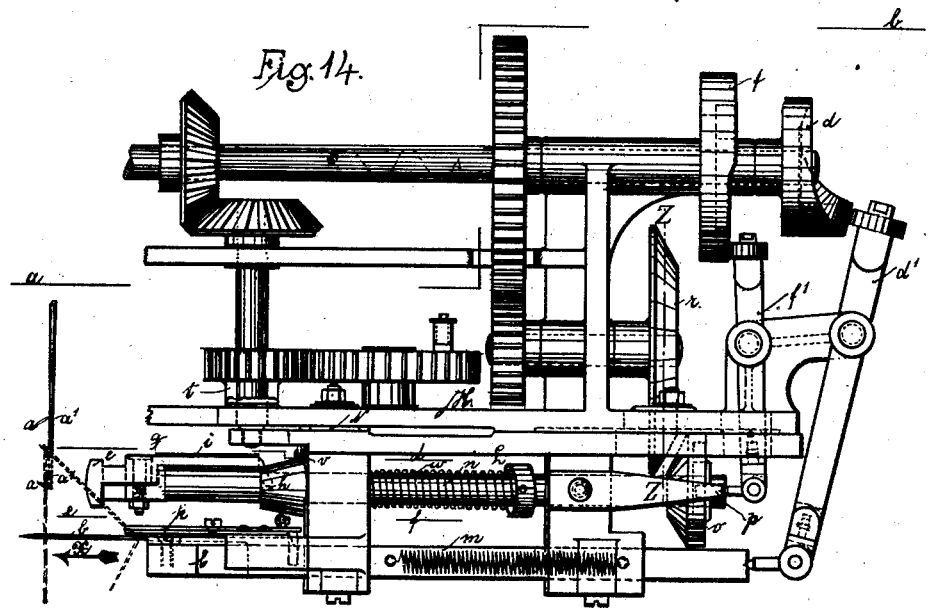
Figure 15:
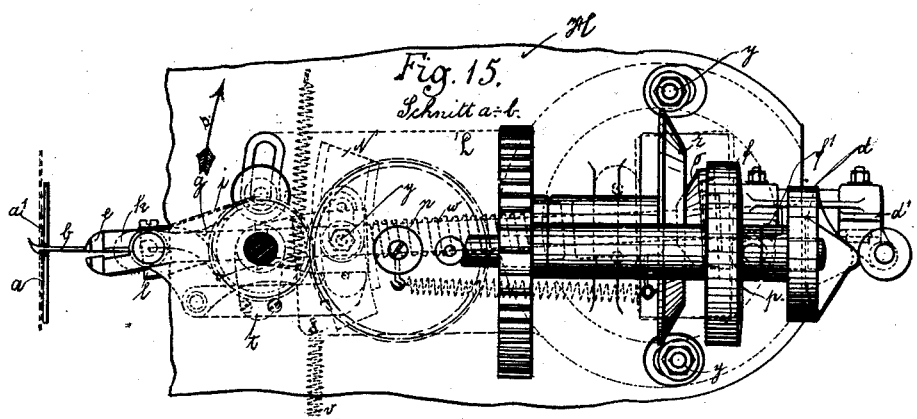
Figure 16:
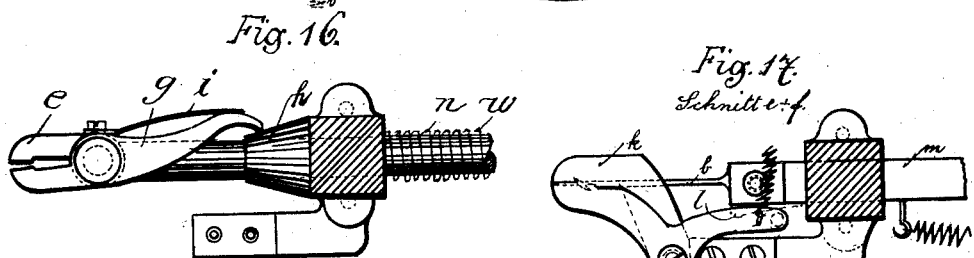
Figure 17:
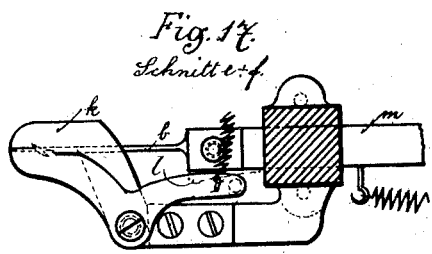

The guide $o'$ on the plate $s$ is secured with capability of oscillation in a horizontal plane. This is necessary in order that the jaws $e\ f$ may be in a position to make a lateral oscillation in the direction of twist and so that the just-united threads may be laid along the ready threads. Fig. 12 shows this operation of the jaws and how the united thread is laid against the thread lying only in the hook $h^2$. The slide-guideway $o'$ receives the curved motion by means of a guide-arm 69, Fig. 6, against which a roller 68, mounted on the rack $h$, runs. A spring 59 opposes the action of the guide-arm 69 on the roller.

In order to be able to hold the thread ends being twisted until the last moment between the jaws $e\ f$ without preventing the twisting, the jaw $e$ is provided at its front end with an incline on its upper face and the jaw $f$ at its rear end with a recess, as Fig. 12 shows.

After formation of the pieced thread the latter is thrown off the hook $h^2$ by a device on the jaw $f$, consisting of a suitably-bent wire 60. It is then by means of the hooks 61, Figs. 2 and 4, carried to the wires 62 below the machine, which prevent its contact with working parts. The hooks 61 are pivoted by pins 72 to the slide o and receive an up-and-down motion from a sleeve on the vertical shaft v, said sleeve operating a slide 65, working on a rectangular upright 64, which slide is provided with an arm 66, between which and the hook 61 guide-rods 67 are arranged.

Figure 9:
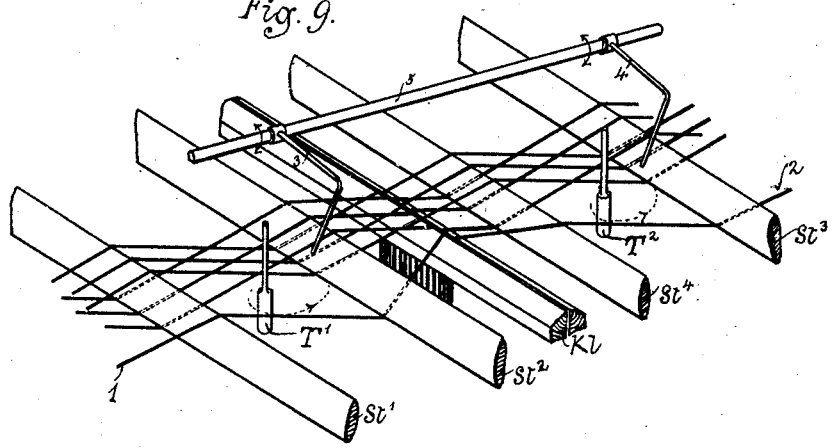
Figure 10:
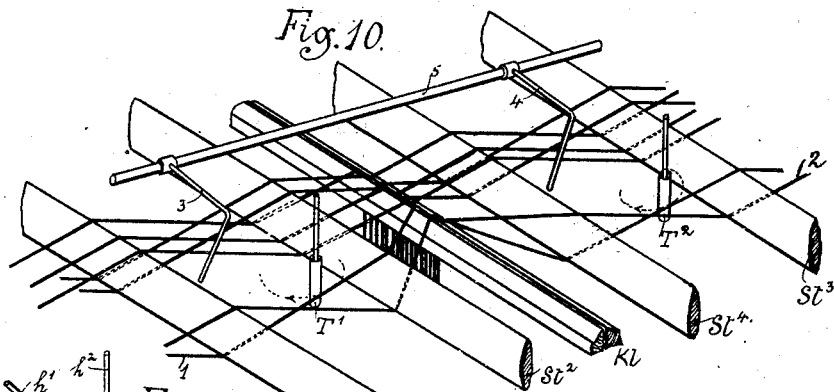
Figure 11:
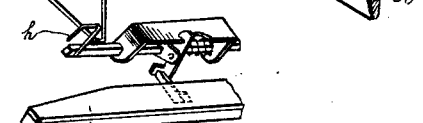

For the purpose of separating the incomplete threads from the threads 1 and 2 being united two fingers 3 and 4 are employed. These in the construction shown are represented as having the form of hooks arranged adjustably on the rod 5. The latter turns in bearings and is capable of being slid longitudinally in a slide 6, guided by suitable means in a straight-line direction and sliding vertically in the framing. The slide 6 receives its motion from the shaft N. This motion may be effected compulsorily—for instance, by means of a cam 7, in the groove of which engages a pin 8, secured to the slide 6 and provided with a roller. The up-and-down motion of the slide 6 is shared by a slide-rod 9, which is guided partly by the slide and partly by the machine-framing. It is connected to the former under the influence of a spring in such manner that it also can receive a downward motion alone. This motion is imparted in the lowest position of the rod 5 and slide 6 by a cam 10 on the shaft N. By this motion of the spring slide-rod 9 there is imparted to the slide 5, with fingers 3 and 4, an oscillating motion in the direction of the arrow in Fig. 2, the lower end of the rod 9 being connected by a guide-bar 11 with an arm 12, secured to the rod 5. By means of this oscillatory motion in the direction of the arrow, Fig. 2, which occurs shortly prior to the commencement of action of the separators T′ T², the threads 1 2, which are not for the time being to be united, are exposed completely ready for the operation of the separators, as shown diagrammatically in Figs. 9, 10. The change of the crossing of the successive threads requires that the fingers 3 and 4 sometimes grip into the lease at the cross-bars St² St³ and another time at the cross-bars St′ St⁴. For this purpose by sliding the rods 5 the fingers are given a common sliding motion along the warp-threads to one side or the other, and during such motion they follow the direction of motion of the separators T′ T². In Figs. 9 and 10 the arrows show the direction of motion at the positions indicated. The common sliding motion of the fingers 3 and 4 along the warp taking place between the threads to be separated and united and those unfinished at the same time effects a thorough separation of the former from the latter, and thus affords absolutely free play for the separators T′ T².

The longitudinal sliding of the rod 5 in one direction or the other is effected by a suitable clutch device, which on downward motion of the slide 6 is actuated in one or the other direction. In the construction shown the device is illustrated as consisting of a crank device 13, turning about a pin secured to the slide 6 and having a guide-rod 15, attached to its pin 14, the other end of said rod being pivoted to a lever 16, having a stationary fulcrum on an arm 17, attached to the slide 6. On the face of the crank-disk 13 are two catch-pins 20 21, arranged diametrically opposite to one another, of which alternately the one or the other—always the lowermost for the time being—is seized by a click-hook 22 or 23 and firmly held during the downward motion of the slide 6, so that the disk is rotated correspondingly. The reversal of the clicks 22 and 23 is effected automatically by the studs 24 25, provided on the rod 5, which as the rod 5 moves in one direction or the other prevent the inactive click from engaging with its pin 20 or 21 by contacting with prolongation of said clicks. The clicks 22 and 23 are held to their work by a spring 26 drawing them together.

The separation of any threads lying one over the other is effected by the whole of the cross-bars receiving an oscillating motion about their longitudinal axis. By reason of the continued change of tension in the threads thus caused the threads lying one over the other fall downward, whereby the parallel position of the whole of the threads is assured. The cross-bars for this purpose have sharp edges and lie with their ends resting in shoes 27, which swing on horizontal pins 28, coaxial with the axis of the bar and mounted in the machine-framing. The shoes 27 have downwardly-projecting arms 29, secured to a common slide-rod 30. The latter may receive its reciprocating motion from the shaft N by means of bell-crank levers 31 and eccentrics 32.

The friction-jaws can be replaced by a kind of pincer mechanism, as shown in Figs. 14 to 17. The operation of the new device is as follows: Supposing the two warp-threads raised by the grippers $a$ $a'$ to be in the highest position, the hooked needle $b$, actuated by eccentric $d$ in the direction of the arrow $x$, seizes the two said warp-threads and introduces them on the return movement into the open pincer-jaws $e$, which now move forward under the action of the eccentric $f$ for the purpose of closing. This results by the one jaw-shank $g$ sliding off the cone $h$, whereupon the pincer-jaws $e$ are closed by the pressure of the spring $i$, and the two warp-threads thus firmly held and at the same time cut off by the shears $k$. At the same moment the following three operations take place: first, introduction of the warp-threads into the mouth of the jaws $e$ by the hooked needle $b$, actuated by the eccentric $d$ and lever $d'$; secondly, retention of the warp-threads by the jaws $e$, actuated directly by the spring $i$ and indirectly by the eccentric $f$ and lever $f'$, and, thirdly, severing of the warp-threads by the shears $k$, actuated by the projection $l$ on the push-rod $m$. If now the shaft $n$, with jaws $e$, moves still farther in the direction of the arrow $x$, the friction-disk $o$ leaves the guard $p$ and is pressed against the constantly-rotating friction-disk $r$ by eccentric $f$ and lever $f'$, whereby the disk $o$ will be set in motion, which motion will be shared by the jaws $e$. The grippers $a\ a'$ during rotation of the jaws $e$ gradually take up the lower dotted-line position until the gripper $a'$ leaves the warp-threads and the jaws $e$ make an oscillating motion in the direction of the arrow actuated by eccentric $t$ and roller $n$. In this manner the after twist is given. Hereupon the jaws commence to retreat in horizontal oscillating and axial direction by action of the springs $v$ and $w$, the jaws open through the shank $g$ ascending the cone $h$, and permit the pieced warp-threads to fall. Simultaneously the friction-disk $o$ leaves the friction-disk $z$, and new warp-threads entering the jaws $e$ the operation will commence again. The horizontal oscillation of the jaws $e$ is brought about by the bearing L for the shaft $n$ being mounted as a plate or dish in the main framing H and being guided in a groove arranged centrally to the bearing. This latter is carried by screw-pins $y$ sliding in central grooves, and it turns about the middle plane Z Z of the friction-disk $r$.

Having thus described my invention, what I claim, and desire to secure by Letters Patent, is—

1. In mechanism for uniting the ends of warp-threads, a rod 5 sliding transversely to the warp-threads, fingers 3, 4 adjustably mounted on said rod, for separating the incomplete threads of the lease from the threads about to be joined, a slide 6 in which said rod slides longitudinally, traveling vertically in the framing, means for imparting an oscillatory motion to said rod in its highest position and means for imparting to said rod during its downward motion a lateral movement, all substantially as and for the purpose set forth.

2. In mechanism for uniting the ends of warp-threads, the combination of jaws $Kl'$, $Kl^2$, a shoe 34 located in the framing, the ordinary stationary thread-clamp above the shoe, containing said jaws, gripper-hooks, means for moving the shoe and jaws vertically up and down, so as to follow the motion of the gripper-hooks, shears located below said jaws for cutting the threads, all substantially as described.

3. In mechanism for uniting the ends of warp-threads, a device for drawing together the threads being lifted by the gripper-hooks, in combination with said gripper-hooks and a bowed wire 57 located below said hooks and having a bridge-bend at its center to receive the threads on their ascent, substantially as described.

4. In mechanism for uniting the ends of warp-threads, means for imparting a lateral oscillatory movement to the thread-grasping jaws in the direction of the twist, comprising the frame of the machine, a plate affixed thereto, the slide $o$ secured to said plate, means for giving the slide an oscillation in a horizontal plane, a guideway $o'$ in said slide, a spring guide-arm 69, a rack working in said slide $o$, and a roller 68 attached to said rack and bearing against the arm 69, all combined and operating, substantially as described.

5. In mechanism for uniting the ends of warp-threads, spring-jaws, means for giving them a pincer action, to receive the warp-threads, a cone engaging with one member of said jaws and holding same open, an eccentric for advancing said jaws so as to disengage said cone, means for imparting an oscillatory motion to said jaws, means for rotating same intermittently, and springs for retreating said jaws in horizontal and axial direction, the parts being constructed, arranged and combined, substantially as and for the purpose set forth.

In witness whereof I have hereunto signed my name this 10th day of November, 1900, in the presence of two subscribing witnesses.

GUSTAV HILLER. [L. S.]

Witnesses:
CHEMNITZ H. SCHILLING,
WILLIAM K. HERZOG.